United States Patent
Chen et al.

(10) Patent No.: US 9,930,320 B2
(45) Date of Patent: Mar. 27, 2018

(54) RESOLVING THREE DIMENSIONAL SPATIAL INFORMATION USING TIME-SHARED STRUCTURED LIGHTING THAT EMBEDS DIGITAL COMMUNICATION

(71) Applicant: Apple Inc., Cupertino, CA (US)

(72) Inventors: Denis G. Chen, Cupertino, CA (US); Chin Han Lin, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 15/146,454

(22) Filed: May 4, 2016

(65) Prior Publication Data
US 2017/0324949 A1    Nov. 9, 2017

(51) Int. Cl.
*H04N 13/02*      (2006.01)
*H04N 7/18*      (2006.01)

(52) U.S. Cl.
CPC ..... *H04N 13/0296* (2013.01); *H04N 13/0203* (2013.01); *H04N 13/0253* (2013.01); *H04N 13/0271* (2013.01)

(58) Field of Classification Search
CPC ........... H04N 13/0203; H04N 13/0253; H04N 13/0271; H04N 13/0296
See application file for complete search history.

(56) References Cited

U.S. PATENT DOCUMENTS

| | | | |
|---|---|---|---|
| 7,046,292 B2 | 5/2006 | Ziemkowski | |
| 7,242,818 B2 | 7/2007 | Beardsley | |
| 7,920,169 B2 | 4/2011 | Jung | |
| 9,379,814 B2 * | 6/2016 | De Bruijn | H05B 37/0272 |
| 9,615,081 B2 * | 4/2017 | Torma | H04N 13/0239 |
| 2007/0268481 A1 * | 11/2007 | Raskar | G01J 1/42 356/218 |
| 2010/0008588 A1 * | 1/2010 | Feldkhun | G01B 11/2518 382/206 |
| 2010/0049488 A1 * | 2/2010 | Benitez | G06T 15/506 703/6 |
| 2015/0237479 A1 | 8/2015 | Fung | |
| 2017/0272731 A1 * | 9/2017 | Kashyap | H04N 5/2256 |
| 2017/0324891 A1 * | 11/2017 | Mark | H04N 5/2256 |

* cited by examiner

*Primary Examiner* — Tsion B Owens
(74) *Attorney, Agent, or Firm* — Blank Rome LLP (57) ABSTRACT

Systems, methods, and computer readable media to resolve three dimensional spatial information of cameras used to construct 3D images. Various embodiments perform communication synchronization between a first image capture system and one or more other image capture systems and generate a first flash pulse that projects a light pattern into an environment. An image is captured that includes the light pattern and a modulated optical signal encoded with an identifier of one of the first image capture system and related-camera information. A second flash from another image capture systems may flash at a second time based on the communication synchronization. During the second flash, the first image capture system captures a second image of the environment. Based on the first and second images, the first image capture system determines the orientation of the second image capture system relative to the first image capture system.

20 Claims, 7 Drawing Sheets

DETERMINED RELATIVE LOCATION AND ORIENTATION OF CAMERAS TO THE SCENE AND EACH OTHER

RESOLVING THREE DIMENSIONAL SPATIAL INFORMATION USING TIME-SHARED STRUCTURED LIGHTING THAT EMBEDS DIGITAL COMMUNICATION

BACKGROUND

This disclosure relates generally to the field of digital image capture, and more particularly to the field of three dimensional (3D) image capturing.

Today's image capturing systems are generally able to digitally acquire 3D images of a physical object by using technology, such as contacting or non-contacting based technology. In contacting based technology, the image capturing system physically interacts with the surface of the physical object to construct a 3D digital image. Alternatively, for some types of non-contacting based technology, rather than physically contacting the object, the image capturing system uses a light source to emit light and detect light reflections off the surface of the physical object. Typically, the light source is a laser-based system that projects a laser on the surface of the physical object. Detectors, such as cameras, measure and/or determine the location of the laser as it reflects off the surface the object. Based on the measured distance and orientation of the detectors, the image capturing systems are able to render a 3D digital image of the physical object.

One type of non-contacting technology involves using a structured-light source to capture 3D images. Structured-light sources project a known pattern of light (e.g., a stripe pattern) onto the surfaces of a physical object to detect for deformations in the pattern. One or more cameras capture the pattern deformities as the structured-light is illuminated onto the physical object. Using the captured pattern deformities, an image capturing system is able to calculate the depth and surface information within the field of view of the camera. Unfortunately, the structured-light sources are often laser-based light sources that typically are expense and power hungry components, and thus, prevent the implementation of 3D image capturing systems as electronic devices that have relatively limited computational and power resources, such as mobile devices.

SUMMARY

In one embodiment, the disclosed subject matter provides a method to resolve 3D spatial information for a plurality of image capturing systems. The method includes obtaining communication synchronization between a first image capture system and one or more additional image capture systems prior to image capturing events. After synchronization, the method then enters an image capturing phase that involves generating a first flash pulse that projects a light pattern into an environment at a first time and captures a first image of the environment that includes the light pattern as deformed by the environment. The first flash pulse may be modulated to encode an identifier of the first image capture system and potentially, other camera information. A second flash from one of the other image capture systems flashes at a second time based on the communication synchronization, where the second flash encodes an identifier of the second image capture system and potentially, other camera information related to the second image capturing system. During the second flash, the first image capture system captures a second image of the environment. Based on the information captured in the first and second images including the identifier and camera information, the first image capture system determines the orientation of the second image capture system relative to the first image capture system.

In another embodiment, the disclosed subject matter provides a method to resolve 3D spatial information in a structured-light system that constructs a 3D image of a scene. The method includes obtaining communication synchronization with a plurality of other cameras, where each of the cameras includes its own structured-light source. After camera synchronization, the method then involves capturing images during a series of image capture events, where one of the structured-light sources flashes for each of the image capture events. Each flash generated from the structured-light sources project a light pattern into a scene that each of the cameras capture in a digital image. The flash generated by one of the structured-light sources may be modulated to encode camera information. The method may then determine the orientation and position in 3D of each of the other cameras based on the captured images.

In yet another embodiment, the disclosed subject matter provides a method to construct a 3D image of a scene. The method includes obtaining communication synchronization between a plurality of cameras, where each of the cameras includes its own structured-light source. The method then involves capturing a plurality of images. For each image capture event a different camera's structured-light source projects a light pattern into an environment (i.e., flashes). Each of the cameras generate a digital image by capturing the environment and light pattern during each flash. The flash generated by the structured-light sources may also be modulated to encode camera information. Each camera may share the digital images and camera information captured during the multiple flashes/image capture events to resolve the relative position of neighboring cameras in a substantially similar manner as described in the previous embodiments. Afterwards, a 3D digital image may be generated by combining at least some of the captured digital images based on the relative position information.

In one embodiment, each of the above described methods, and variations thereof, may be implemented as a series of computer executable instructions. Such instructions may use any one or more convenient programming languages. Such instructions may be collected into modules and/or programs and stored in any media that is readable and executable by a computer system or other programmable control device. In yet another embodiment, the disclosed methods may be implemented in an electronic apparatus having image capture capabilities.

DETAILED DESCRIPTION

This disclosure pertains to various embodiments of coordinating cameras and resolving 3D spatial information in a structured-light system. In one embodiment, the structured-light system is a multi-camera system, where each camera is capable of capturing a scene in which a pre-configured pattern of light has been projected. Each of the cameras has an independent light source with a known spatial relationship with the camera's image sensor. Prior to image capturing events, the cameras may be synchronized to share a single light source such that one of the cameras flashes its light source for any given image capture event. The synchronization process may provide a flash sequence and/or timing of when each of the cameras flashes its light source. After synchronization, when one of the cameras flashes its light source, a pre-configured pattern of light, such as a two-dimensional (2D) array of dots, is projected into a scene for an image capturing event. In one embodiment, each of the cameras record the pattern of light illuminated into the scene by each of the other cameras' light sources and its own light source to determine a model of the scene. Each of the cameras may also be adapted to modulate its flash (e.g., amplitude of light) to encode a variety of camera information, such as a camera's unique identifier (ID) during the image capture events. By encoding camera information, other synchronized cameras that capture an image not only capture the scene with the pattern of light, but also detect which camera provided the flash. The detection of the modulated information includes using the same image sensor for detecting the scene in a high frame-rate mode, sampling a subset of the image sensor's pixels at a relatively high speed, or an auxiliary optical sensor circuit with a relatively high bandwidth. After a series of image capture events occur, each camera may combine its captured images of the scene to extract information relating to the relative position of other cameras in the scene. Each of the cameras may also interact with each other to improve 3D depth sensing by sharing digital images and stitching together the multiple digitals images captured for a given image capture event based on the relative position of each camera system.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100A and 100B). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For the purpose of this disclosure, the term "lens" refers to a lens assembly, which could include multiple lenses. In one or more embodiments, the lens may be moved to various positions to capture images at multiple depths and, as a result, multiple points of focus. Further in one or more embodiments, the lens may refer to any kind of lens, such as a telescopic lens or a wide angle lens. As such, the term lens can mean a single optical element or multiple elements configured into a stack or other arrangement. In like manner, the term "camera" refers to an image capturing device with at least one single lens assembly along with one or more sensor elements and other circuitry utilized to capture an image. For purposes of this disclosure, two or more cameras may share sensor elements and other circuitry, but include two different lens assemblies. However, in one or more embodiments, two or more cameras may include separate lens assemblies as well as separate sensor elements and circuitry.

Figure 1:
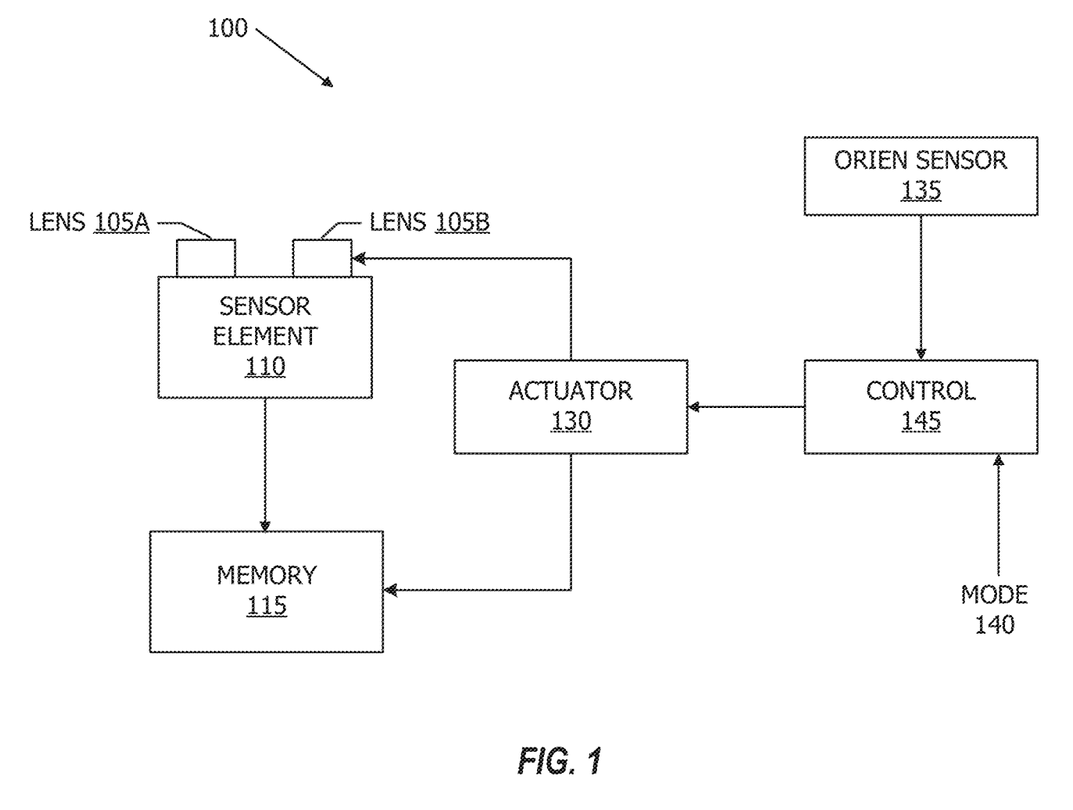
FIG. 1 shows, in block diagram form, a simplified camera system according to one or more embodiments.

Referring to FIG. 1, a simplified block diagram of camera system 100 is depicted in accordance with one or more embodiments of the disclosure. Camera system 100 may be part of a single camera device, such as a digital camera or may be part of a multi-camera system that is working together to capture images of a scene. Camera system 100 may also be part of an electronic multifunctional device, such as a mobile phone, tablet computer, personal digital assistant, portable music/video player, and/or any other electronic device that includes a camera system. In one or more embodiments, the camera system can use a camera with one (e.g., only lens 105A for example) or more lens (e.g., lenses 105A and 105B). Specifically, lenses 105A and 105B may each include a lens assembly that includes a number of optical lenses, each with various lens characteristics. For example, each lens may include its own physical imperfections that impact the quality of an image captured by the particular lens. When multiple lenses are combined, for example in the case of a compound lens, the various physical characteristics of the lenses may impact the characteristics of images captured through the lens assembly, such as focal points. In addition, each of lenses 105A and 105B may have similar characteristics, or may have different characteristics, such as a different depth of focus.

As depicted in FIG. 1, camera system 100 also includes a sensor element 110. Sensor element 110 comprises one or more separate image sensors that detect and convey the information that constitutes an image. Light may flow through the lens 105 prior to being detected by sensor element 110 and be stored, for example, in memory 115. In one or more embodiments, each of the lens systems 105 may be associated with a different sensor element or, as shown, may share a single sensor element 110.

Camera system 100 may also include an actuator 130, an orientation sensor 135 and mode select input 140. In one or more embodiments, actuator 130 may manage control of one or more of the lens assemblies 105. For example, the actuator 130 may control the lens position and aperture size of each lens 105. Orientation sensor 135 and mode select input 140 may supply input to control unit 145. In one embodiment, camera system may use a charged coupled device, a complementary metal-oxide semiconductor, or a thin-film transistor device as an image sensor, an electro-mechanical unit (e.g., a voice coil motor) as actuator 130 and an accelerometer, a gyro sensor, or combination thereof as orientation sensor 135.

Figure 2:
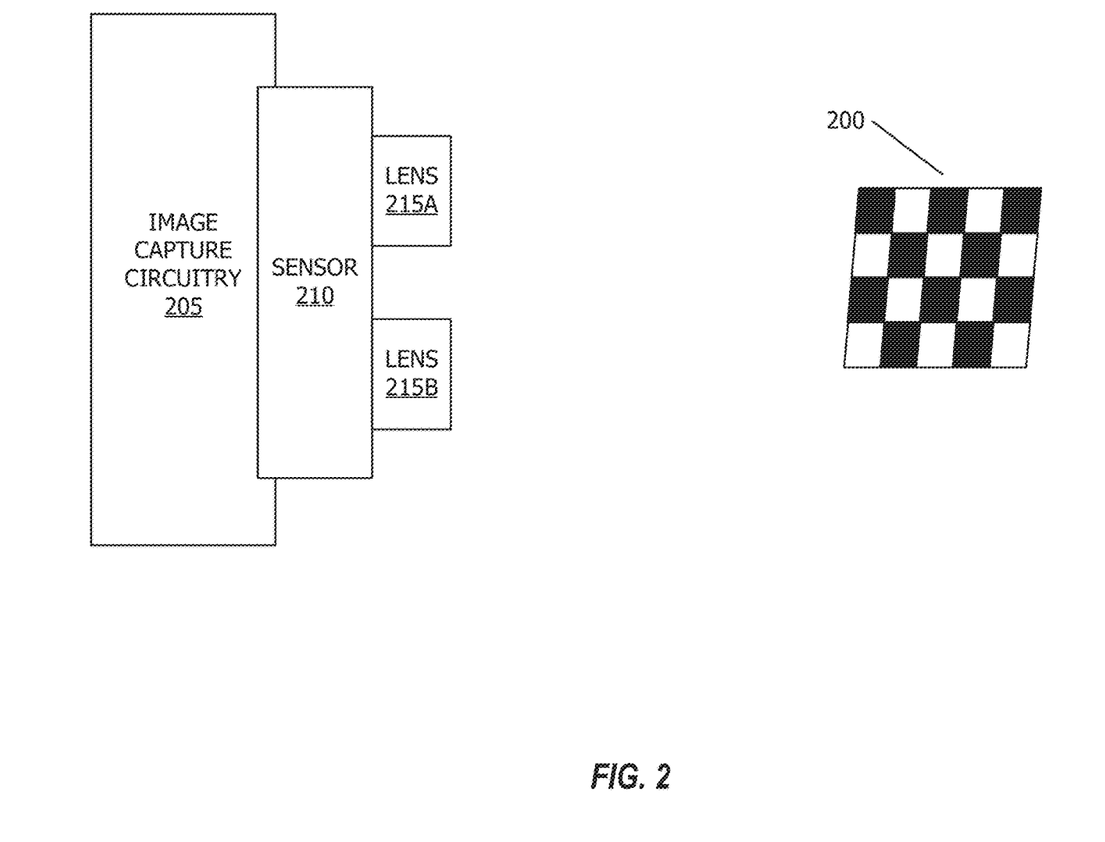
FIG. 2 shows, in block diagram form, an example multi-camera system for camera calibration.

FIG. 2 is a block diagram that depicts a type of camera system that may be used to capture 3D images according to one or more embodiments. In one or more embodiments, lens 215A and lens 2153 may be independent lens assemblies, each having their own optical characteristics that capture images of an object, such as object 200, in different ways. Each lens assembly may in addition have a separate associated sensor element 210. Alternatively, lens assemblies 215 may share a common sensor element.

FIGS. 1 and 2 illustrate specific embodiments of a camera system, but the disclosure is not so limited. For instance, embodiments of the present disclosure may include other well-known image capturing components and/or sensors not shown in FIGS. 1 and 2. For example, the camera system 100 may include other types of sensors, such as proximity and/or ambient lighting sensors in addition to the sensor element 110. Additionally, other components, such as filters and motion sensors (e.g., gyroscopic and accelerometer sensors), may also be found within camera system 100. FIGS. 1 and 2 are only examples to facilitate ease of description and explanation.

Figure 3A:
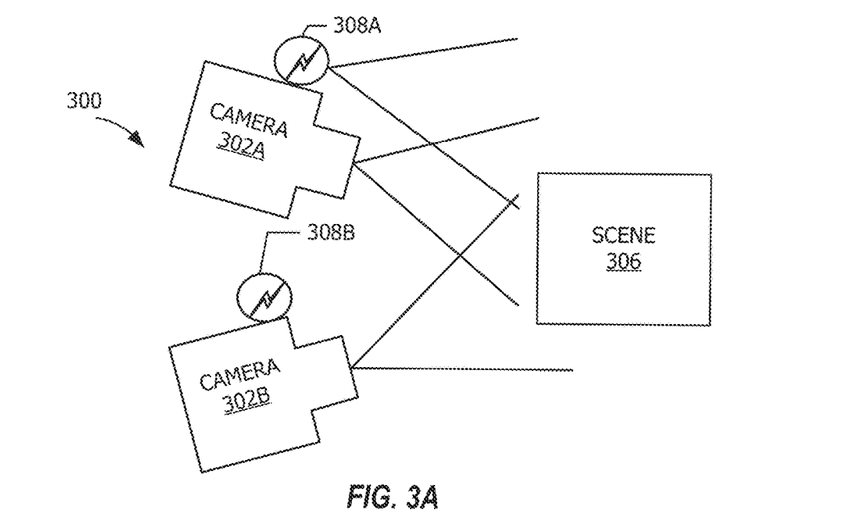
FIG. 3A is a schematic diagram of an embodiment of a multi-camera system where embodiments of the present disclosure may operate herein.

FIG. 3A is a schematic diagram of a multi-camera system 300 where embodiments of the present disclosure may operate herein. As shown in FIG. 3A, the multi-camera system 300 comprises a plurality of cameras 302 that capture a scene 306. The scene 306 may comprise one or more physical objects that are located within at least a part of the field of view for each of the cameras 302. Camera 302 may be substantially similar to the camera system 100 and/or camera system 200 as described in FIGS. 1 and 2. Additionally, each of the cameras 302 may include an independent structured-light source 308 adapted to project a pre-determined light pattern (e.g., a 2D array of dots or pattern of lines) into scene 306. The structured-light source 308 may include one or more optical flash components that discharge light to project the pre-determined light pattern and illuminate the scene 306. In one embodiment, the structured-light source 308 generates a flash using high-current, low voltage light emitting diodes (LEDs). Other embodiments may use other types of flash devices, such as xenon-based flash devices or one or more laser elements, such as vertical cavity surface emitting lasers (VCSEL) in single element or array form projected through an optical lens system, to illuminate the scene 306. The structured-light source 308 may include other electronic components known by persons of ordinary skill in the art to generate a flash of light and synchronize the structured-light source 308 with its corresponding camera 302 to capture an image (e.g., synchronization the structured-light source 308 with the camera's shutter).

In FIG. 3A, cameras 302A and 302B may synchronize with each other such that after synchronization, the cameras share the structured-light sources 308 for a given image capture event. In particular, cameras 302A and 302B can share the structured-light sources 308 by having one of the structured-light sources flash onto the scene 306 for a given image capture event (e.g., 308A or 308B). In one embodiment, the sharing of structured-light source 308 and synchronization of cameras 302A and 302B may generate a flash sequence that dictates the order, and delay between, each of the structured-light sources 308 flash. For example, during synchronization of cameras 302A and 302B, the cameras 302 may communicate with each other so that the structured-light source 308A of camera 302A will flash first and then the structured-light source 308B of camera 302B will flash a specified time thereafter (e.g., about 10 microseconds) during image capturing events. Flashing the selected structured-light source 308 one at a time offers the benefit of minimizing disruptions or interferences caused by projecting multiple, overlapping, patterns of light into a scene 306. To synchronize cameras 302, they can utilize any desired communication protocol such as a network multiple access protocol, such as carrier sense multiple access with collision avoidance (CSMA/CA). Other embodiments may synchronize cameras 302 by communication with each other using audio frequency signals (e.g., speaker as transmitter and microphone as receiver), radio frequency signals (e.g., Bluetooth®, WiFi®, cellular, etc.), or optical signals (e.g., the light source 308 as transmitter and camera 302 as receiver).

In one embodiment, cameras 302A and 302B may perform a synchronization process using one or more flash events generated from the structured-light sources 308. The optical signals generated from the flash events may be used to implement the network multiple access protocol. For example, when synchronizing cameras 302A and 302B, a user may trigger a first flash event that encodes a first camera's 302A ID by accessing a camera application software. The first camera 302A may broadcast the first flash event that encodes its ID when the first camera 302A does not sense existing flash events by other cameras (e.g., camera 302B). During the broadcast of the first flash event, the first camera's 302A detection system monitors the first flash event to validate the received digital code and received dot pattern against what was sent in the first flash event. If a second camera 302B makes a transmission which overlaps with the first camera 302A, the second camera's 302B flash event would corrupt the modulated information sent in the first camera's 302A flash. Both the first camera 302A and the second camera 302B may detect the collision event that corrupts the modulated information. In one embodiment, the first camera 302 would obtain an error in the digital code validation and the dot image pattern 312A. Once a collision event is detected, the cameras 302A and 302B may wait and re-start their flash sequences based on a prearranged flash protocol. One example of a prearranged flash protocol is where both cameras 302A and 302B wait for a random number (e.g., a number less than a maximum allowable threshold value) of time slots and re-broadcast their IDs through additional flash events. The synchronization process may continue to repeat until one or more of the cameras 302A and 302B fail to detect a collision event. The detector function may remain in an "on" state for a portion (e.g., switch back and forth from an "on" state to a "off" state) or for the entirety of the synchronization process in both cameras 302A and 302B, for example, even when the cameras 302A and 302B are not sending flash events.

Once the cameras 302A and 302B communicate their IDs to each other, cameras 302A and 302B can continue the synchronization process with the transmission of other flash events based on the IDs of the cameras. For example, cameras 302A and 302B may continue transmission of flash events on alternating time-slots dictated by the alphanumeric order of their IDs. In one embodiment, the alternating time-slots can be aligned to the end of a maximum allowable time slot used for transmitting camera IDs. Additional synchronization information can be transmitted in these subsequent flash events if all of the synchronization information cannot be sent within a single optical signal corresponding to a single flash event.

The collision detection and avoidance synchronization process may also be applicable to systems with more than two cameras. In general any physical layer multiple access protocol can be used in this step to establish synchronization and embodiments within this disclosure are not restricted to any single protocol. Using a flash rather than radio-based technologies (e.g., Wi-Fi® and Bluetooth®) to perform camera synchronization, allows cameras 302 to be synchronized with each other to within a microsecond range. In other words, camera 302A is able to determine when camera 302B should flash to within a few microseconds, which is ordinarily more accurate than radio frequency (RF) wireless technology that currently produce synchronization delays in the range of milliseconds when accounting for factors, such as hardware and software in its stack.

Figure 3B:
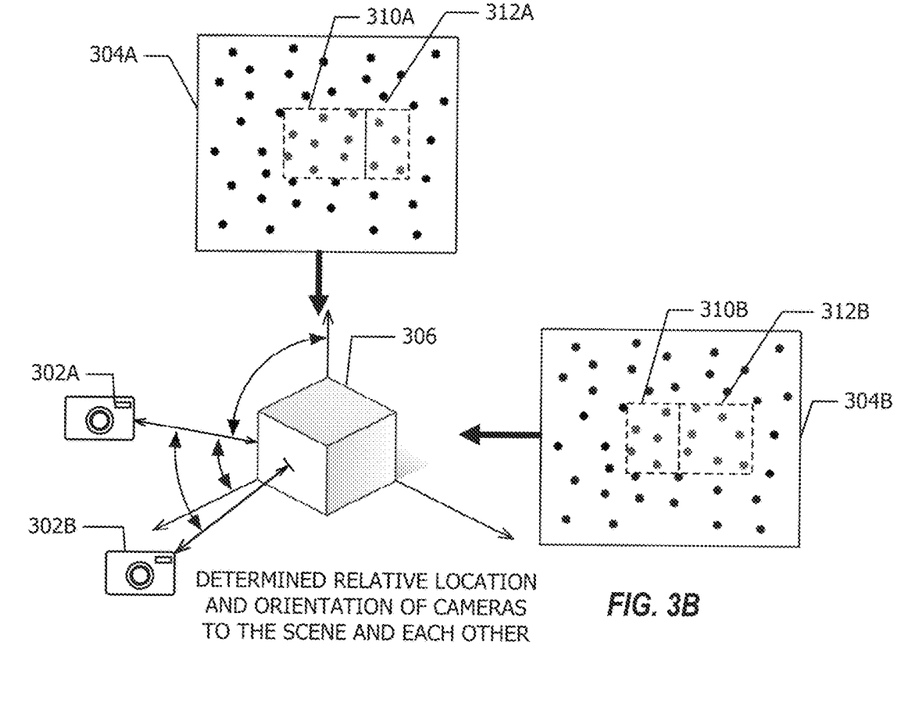
FIG. 3B shows, in block diagram form, the multi-camera system determining relative location and orientation of each of the cameras.

After cameras 302A and 302B synchronize, FIGS. 3A and 3B illustrate that cameras 302A and 302B capture digital images of the scene 306 for a plurality of image capture events. For each of the image capture events a single structured-light source 308 flashes its pre-configured pattern into scene 306. In FIGS. 3A and 3B, cameras 302A and 302B each capture two different images during the two image capture events. In the first image capturing event, camera's 302A structured-light source 308A flashes to project the dot pattern 304A into the scene during which time camera 302A (and perhaps 302B) capture an image of the scene 306. In the second image capture event, camera's 302B structured-light source 308B flashes to project the project dot pattern 304B into the scene 306 during which time camera 302B (and perhaps 302A) capture an image of the scene 306.

In addition to the projecting the dot patterns 304, the structured-light source 308 also provides other camera information, such as a camera identifier, by modulating the flash of light (e.g., amplitude modulation) during the image capture event. In one embodiment, the structured-light source 308A for camera 302A projects an optical signal that is encoded with a unique ID corresponding to camera 302A and the structured-light source 308B for camera 302B projects an optical signal that is encoded with the unique ID corresponding to camera 302B. Other cameras that receive the modulated flash of light are able to use the unique ID to determine which captured images corresponds to which camera's structured-light source 308. Other embodiments of the structured-light source 308 are capable of producing an optical signal that includes other camera information, such as focal length, camera class, and/or camera type. Modulation of the optical signal produced by the structured-light source 308 is discussed in more detail in FIGS. 4 and 5.

Once an image capture event occurs, each of the cameras 302 captures a digital image of scene 306. FIGS. 3A and 3B illustrate that each of the cameras 302 are setup at different locations and with different orientations relative to the scene 306 and each other. In one embodiment, prior to capturing any images of the scene, cameras 302 are unaware of each other's relative locations and orientations. To determine the orientation of other cameras 302, each of the cameras 302 captures a plurality of image, where each image corresponds to one image capture event. Using FIGS. 3A and 3B as an example, in the first image capture event, when camera's 302A structured-light source 308A flashes the dot pattern 304A, camera 302A captures the dot image pattern 310A as reflected off of scene 306, and camera 302B captures the dot image pattern 310B as reflected off of scene 306. In the second image capture event, when camera's 302B structured-light source 308B flashes the dot pattern 304B, camera 302A captures the dot image pattern 312A, and camera 302B captures the dot image pattern 312B. The dot patterns 304A and 304B could be the same, but in other embodiments, the dot patterns 304A and 304B could be different. With prior knowledge of 304A and 304B, camera 302A may then be able to compare the differences of the two captured image patterns 310A and 312A and determine the amount of rotation and distance via the spacing and size of the dots to view the scene 306 from camera's 302B orientation. Additionally, camera 302B is also able to compare the differences of the two image patterns 310B and 312B and determine the amount of rotation and distance to view the scene 306 from camera's 302A orientation.

Once the series of image capture events is complete, each of the cameras 302 may determine the relative orientation and/or location of the other cameras 302 using a least error type algorithm, by correlating the relative orientation and location to the 3D scene resolved by each of the cameras, and/or other types of optimization techniques well-known in the art of computer vision. In one example, camera 302A may compare the differences between the dot image patterns 310A and 312A by executing a least error type algorithm. If the cameras 302 have locally stored prior knowledge of the configuration information (e.g., focal length) for each of the cameras 302 or they have the same camera and lens properties (e.g., same focal length), each of the cameras 302 (e.g., camera 302A) are able to determine the relative orientation and locations of the other cameras without receiving any specific configuration data from the other cameras 302 (e.g., camera 302B). Conversely, if the cameras 302 have different camera and/or lens properties, and the cameras are unable to share configuration information with each other, then each camera 302 may be able to obtain orientation information, but not location information.

In another embodiment, if the cameras 302 do not have the same camera and/or lens properties, each of the cameras 302 may be configured to use the structured-light sources 308 to generate modulated optical signals that communicate additional camera and/or lens configuration information. For example, to encode more information within the optical signal generated during an image capture event, camera 302 may increase the amplitude modulation rate so that additional data bits are transmitted during each flash event. The modulation pattern generated for the optical signal could be transmitted using a specific coding format, such as <camera ID, configuration/focal length>. Additional or alternatively, camera 302 can modulate a portion of the optical signal to include the camera's unique id, and modulate another portion of the optical signal to include a class or type of camera identifier. Camera 302 may then use the class or type of camera identifier to find (e.g., perform a table lookup) camera configuration information stored in local or remotely accessed memory to determine the relative location of the each of the cameras 302. Once a camera establishes the relative locations of each of the others cameras 302 in a 3D space, other physical sensors, such as a gyroscope and accelerometer can be used to augment positional accuracy or to maintain positional lock relative to the other cameras 302.

Each of the cameras 302 may be configured to sense the modulation of optical signals originating from other cameras 302 using one or more optical sensors. In one embodiment, cameras 302 may sense the modulation of optical signals using one or more dedicated photo-diodes in an optical sensor, such as a camera's proximity sensor and/or ambient light sensor. In another embodiment, some of a camera's pixels may be used as photo diodes, such as pixels dedicated for autofocus operations on the camera's image sensor. In one embodiment, pixels within the camera 302 may be dynamically reconfigured to reassign pixels depending on the relative position of the camera 302 and the structured-light source 308 generating the flash. For example, if a camera's structured-light source 308 is located relatively to the right of the camera 302 capturing the image, then the camera's pixels used as a photo-diode detector of flash modulation may be reassigned to another camera pixel closer to the flashing structured-light source 308. Sensing and decoding of the modulation of optical signals are described in more detail in connection with FIG. 6.

The multi-camera system 300 may also be configured to perform augmented reality applications where multiple users interact with each other. After an image capture event or a series of image capture events, each of the cameras 302 may share captured digital images and camera information using one or more connections using for example Bluetooth®, Wi-Fi®, and/or other forms of a communication network connection. To improve measuring speed and to enhance 3D depth sensing, one or more of the cameras 302 within the multi-camera system 300 may register and stitch together the multiple captured images. Cameras may use any registration and stitching technique known by persons of ordinary skill in the art to combine the multiple captured images.

Although FIG. 3 illustrates a specific embodiment of a multi-camera system 300, the disclosure is not limited to the specific embodiment illustrated FIG. 3. Other embodiments of the multi-camera system 300 may include more than two cameras 302 that generate a sequence of more than two flash events. For example, the multi-camera system 300 may include four cameras located at different positions and different orientations. The synchronization process between the cameras 302 may generate the following flash sequence: camera's 302A structured-light source 308A may discharge light at a first image capture event; camera's 302B structured-light source 308B may discharge light at a second image capture event; a third camera may use its structured-light source to discharge light at a third image capture event; and a fourth camera may use its structured-light source to discharge light at a fourth image capture event. Each of the cameras may be able to compare the differences of each image associated with each flash event to determine the position and/or orientation of the other cameras. Other embodiments of the multi-camera system 300 may implement other flash sequences. The use and discussion of FIG. 3 is only an example to facilitate ease of description and explanation.

Figure 4:
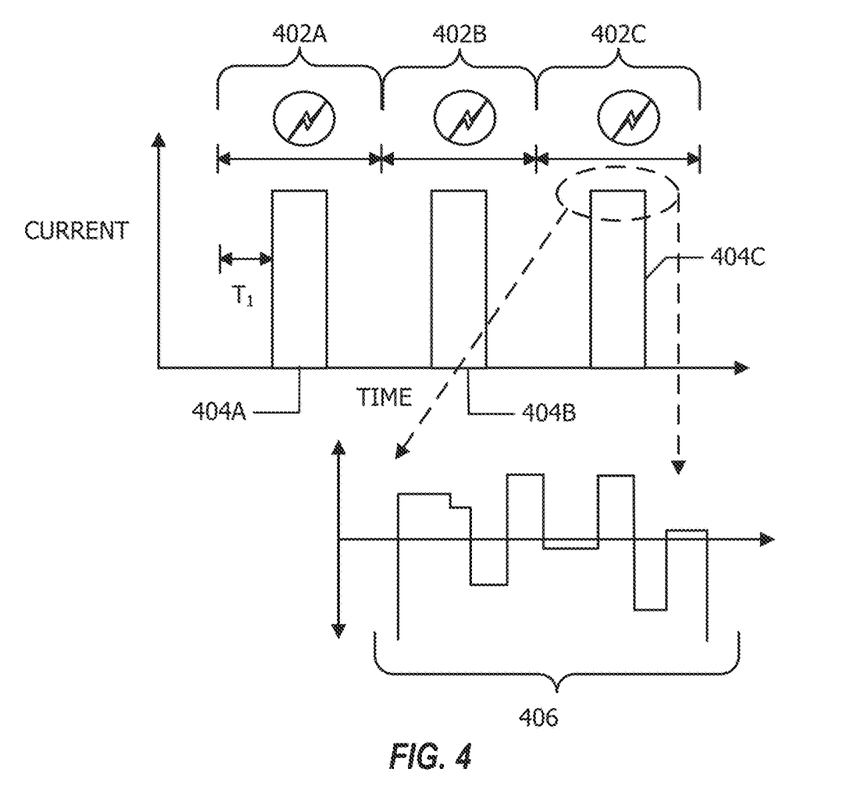
FIG. 4 is a timing diagram of an embodiment of modulated optical signals for encoding digital information.

FIG. 4 is a timing diagram of an embodiment of modulated optical signals for encoding digital information. In one embodiment, a power source may be configured to power a camera's structured-light source to generate an optical signal. Rather than generating an optical signal with a uniform amplitude, the camera's structured-light source can modulate (e.g., amplitude, frequency, or phase) current pulses during a flash's on-cycle to encode digital information. FIG. 4 illustrates that three different modulated current pulses 404A, 404B, and 404C may have a time delay of $T_1$ and are generated for image capture events 402A, 402B, and 402C, respectively. The different current pulses 404A-C correspond to on-cycles or flashes of light output from one or more structured-light sources. As shown in FIG. 4, data information 406 is encoded within the amplitude of current pulse 404C. By varying the amplitude of the current pulses 404A-C, data information 406 may be encoded within the optical signal produced from flashes of light from the structured-light sources. The data information 406 may include a variety of camera information, such as camera type, focal length, and a camera's unique ID.

Figure 5:
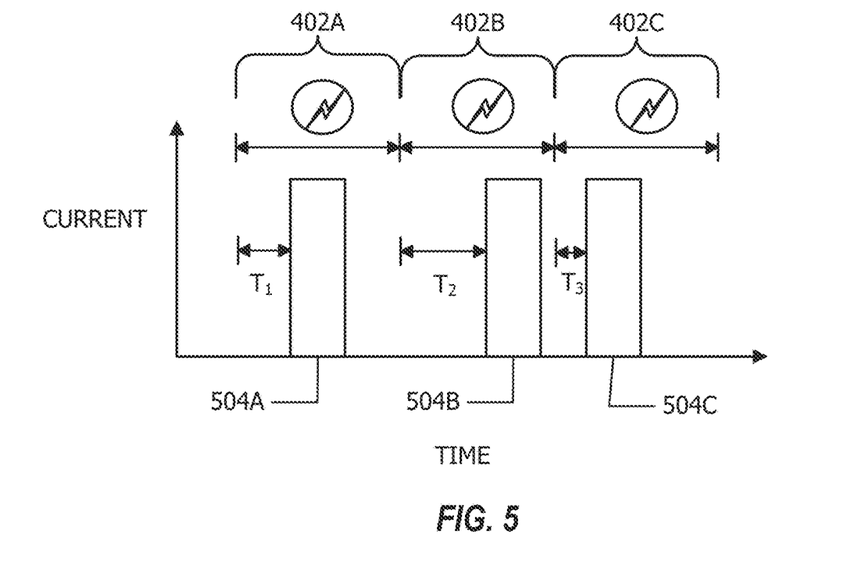
FIG. 5 is a timing diagram of another embodiment of modulated optical signals for encoding digital information.

FIG. 5 is a timing diagram of another embodiment of modulated optical signals for encoding digital information. The modulated current pulses 504A, 504B, and 504C embeds information based on the relative time delay between current pulses 504A, 504B, and 504C in reference to one or more delay criteria, such as a predetermined time delay and/or a pre-configured timestamp. Rather than using a set or uniform time delay between image capture events, different time delays between the current pulses 504A, 504B, and 504C may be used to encode camera related information. As shown in FIG. 5, the time delay $T_2$ between current pulse 504A and 504B and time delay $T_3$ between current pulse 504B and 504C differs from the time delay $T_1$ for current pulses 504A. The time delay difference $T_2$ and $T_3$ may be compared to one or more delay criteria to encode the camera information. Other embodiments of modulated optical signals may use both the amplitude modulation as described in FIG. 4 and the relatively time delay modulation as described in FIG. 5 to encode camera information.

Figure 6:
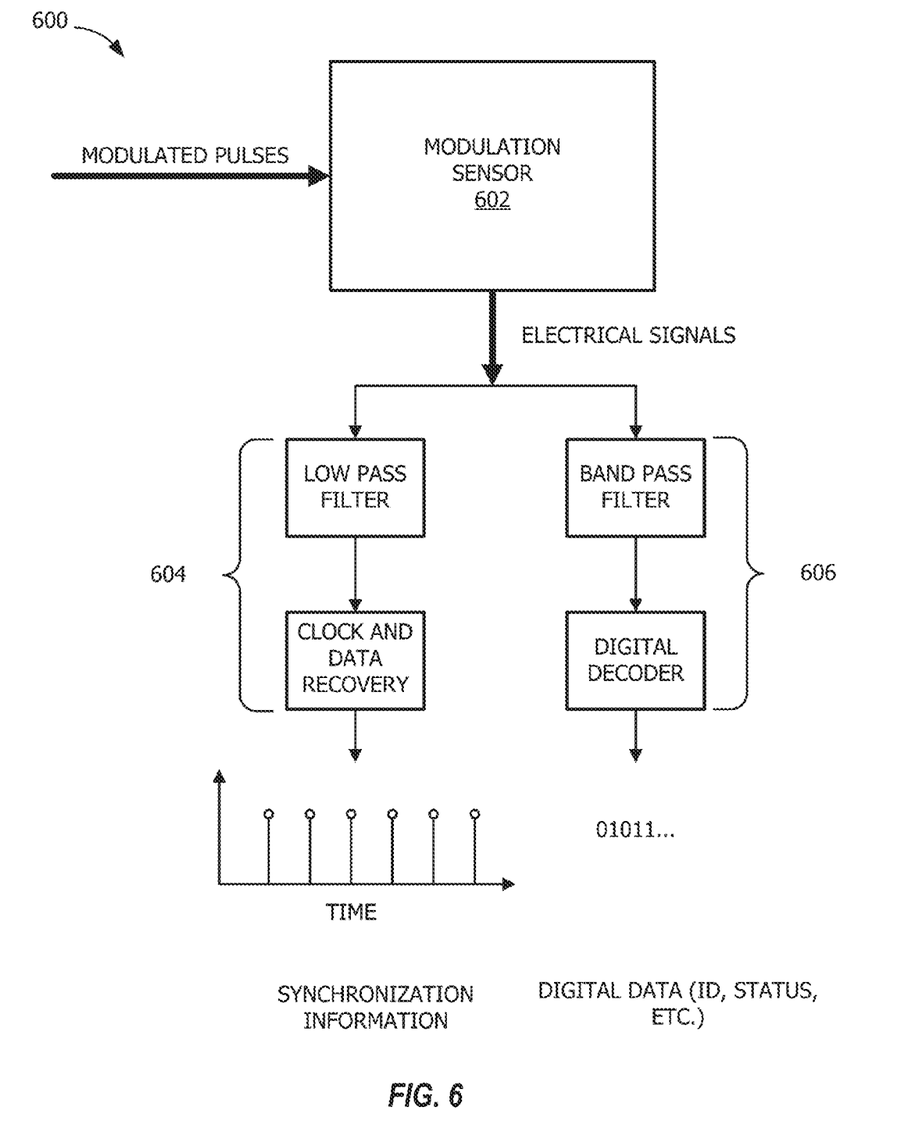
FIG. 6 shows, in block diagram form, sensing and processing optical signals generated from flash events within a camera system.

FIG. 6 is an example block diagram for sensing and processing the modulation of optical signals generated from flash events within a camera system 600. Camera system 600 may comprise a modulation sensor 602 configured to detect modulated pulses within an optical signal. The modulation sensor 602 may be implemented using a camera's proximity sensor, ambient light sensor, and/or other optical sensors within camera system 600. In one embodiment, the modulation sensor 602 comprises one or more dedicated photo-diodes that detect the modulated pulses (e.g., in a high frame rate). In another embodiment, some of a camera's pixels within an image sensor are used as photo diodes, such as pixels dedicated for autofocus operations on the camera's image sensor. Pixels within the camera may be dynamically reconfigured to reassign pixels depending on the relative position of the structured-light source generating the flash. In another embodiment, the modulation sensor 602 may be auxiliary optical sensor circuit associated with a relatively high bandwidth. After receiving the modulated optical signal, the modulation sensor 602 may be configured to convert the optical signal into an electrical signal for data processing.

The electrical signal corresponding to the modulated optical signal may then be input into two different sets of filters to decouple the carrier pulse frequency information from the digital data. In FIG. 6, the filter set 604 is configured to recover the pulse timing and synchronization information associated with the received modulated optical signal, and the filter set 606 is configured to extract the camera information encoded within the received modulated optical signal. To recover the pulse timing and synchronization information, the filter set 604 comprises a low-pass filter (LPF) and a clock and data recovery (CDR) circuit. To extract the camera information, the filter set 606 is implemented using a band pass filter and a digital decoder to extract the digital data, such as the camera unique ID.

Figure 7:
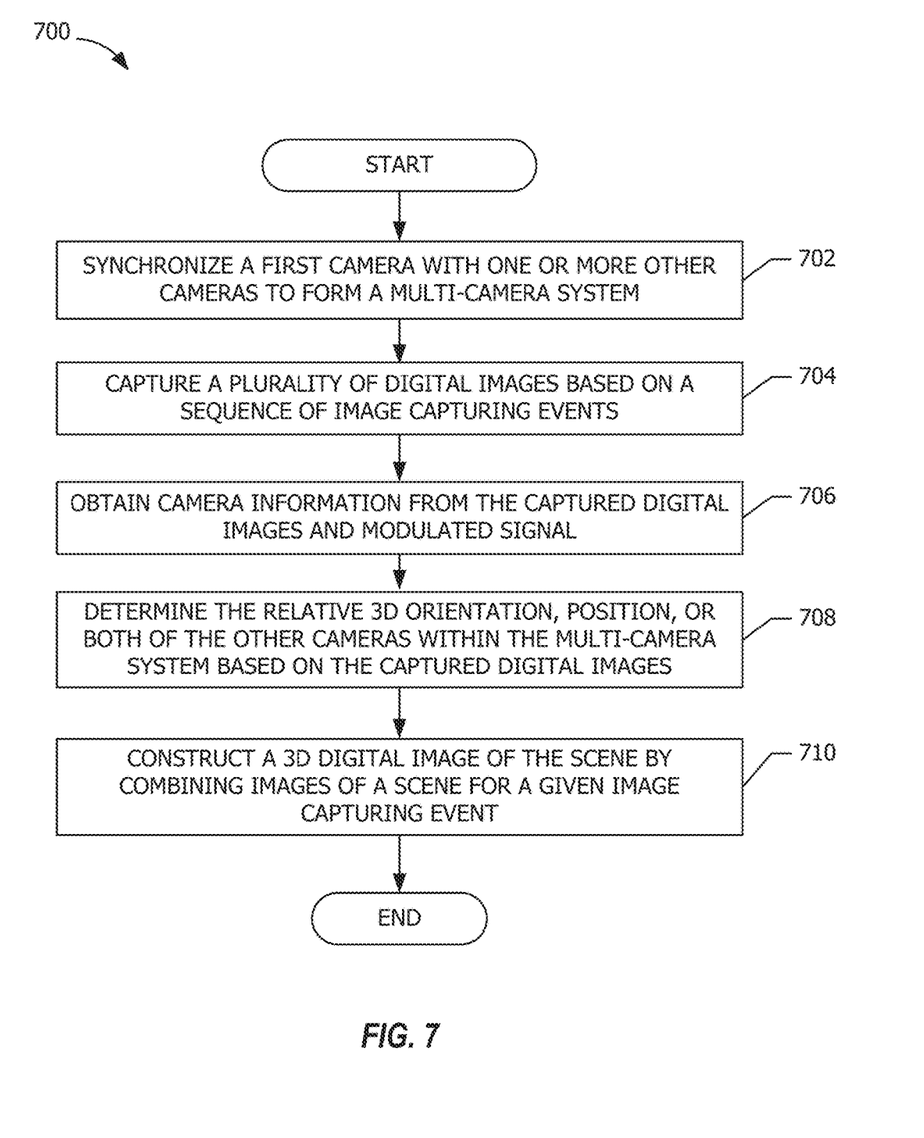
FIG. 7 is a flowchart of an illustrative method to coordinate cameras and construct 3D images using structured-light sources.

FIG. 7 is a flowchart of an embodiment of method 700 to resolve 3D spatial information of cameras and construct 3D images using structured-light sources. In one embodiment, method 700 may be implemented by a camera located within a multi-camera system configured to capture images of a scene at different orientations and/or positions. Using FIG. 3 as an example, method 700 may be implemented by camera 302, which includes its own independent structured-light source 308. During an image capture event, method 700 may turn on the independent structured-light sources 308 to produce a pre-configured pattern that is projected into the scene and includes a modulated optical signal that includes camera information. By capturing the multiple images over a series of image capture events and sharing the images with other cameras 302 within the multi-camera system, method 700 is able to determine the relative position and orientation of the cameras 302 and render a 3D image of the captured scene.

Method 700 starts at block 702 to synchronize a first camera with one or more other cameras to form a multi-camera system. Synchronization may be implemented using any network access protocol such as CSMA/CA. Using CSMA/CA as the communication protocol to synchronize with other cameras may minimize the effects of disruptions or interferences caused by projecting multiple patterns of light into an environment. In one embodiment, method 700 may communicate with other cameras using RF based technology such as Wi-Fi® and Bluetooth®. In another embodiment, method 700 may reduce synchronization delay by performing one or more flash events to synchronize with the other cameras. The flash events may include modulated optical signals that carry data information used to synchronize the camera.

The synchronization process may also set up an ordered flash sequence of when structured light sources for a given camera will flash. In one embodiment, the synchronization process may involve communicating the entire flash sequence to every camera. For example, at block 702, method 700 and other cameras within a multi-camera system may receive the entire flash sequence where, based on the flash sequence, a first camera used in method 700 is aware that it flashes its own structured light source first, a second structured light source for a second camera will flash a first specified time thereafter (e.g., 10 microseconds), and a third structured light source for a third camera will flash a second specified time after that (e.g., 15 microseconds) after that. In another embodiment, the synchronization process may not communicate the entire flash sequence and instead communicates a portion of the flash sequence for each of the cameras. For example, at block 702, a camera used in method 700 may receive and determine that it is first in the flash sequence and may not be aware of when the other camera's structured light source flashes. In another example, the camera used in method 700 may receive and determine that its light source flashes about 10 microseconds after a given camera (e.g., the third camera in the flash sequence) flashes and is not aware of any other portion of the flash sequence.

Method 700 then moves to block 704 and captures a plurality of digital images of a scene based on a sequence of image capture events. Specifically, method 700 may capture a digital image for each of the image capture events based on the information obtained during synchronization. The sequence of image capture events may correspond to the flash sequence method 700 identified during the synchronization process in block 702. For each image capture event, one of the structured-light sources for a camera may flash to project a pattern of light into the scene and generate a modulated optical signal representative of camera information. At block 704, method 700 captures the pattern of light illuminated into the scene and the modulated optical signal for each of the image capture events.

Method 700 continues to block 706 and obtains camera information from the captured digital images and modulated optical signal. Method 700 detects the modulated pulses within the optical signal for each of the captured digital images by using filters to decouple the carrier pulse frequency information from the digital data. Examples of camera information encoded with the optical signal include, but are not limited to a camera's unique ID, camera class, camera type, and camera and lens properties (e.g., focal lengths). Afterwards, method 700 moves to block 708.

At block 708, method 700 determines the relative 3D orientation and/or position of each camera within the multi-camera system. To determine the relative 3D orientation and/or position, method 700 may compare the differences of the digital images captured for the different image capture events. The comparison may include using a least error type algorithm and/or by correlating the relative orientation and/or location to the 3D scene to determine the orientation, position, or both of each camera. If the cameras within the multi-camera system have locally stored prior knowledge or uses the same camera and lens properties (e.g., same focal length), method 700 is able to determine the relative orientation and locations of each camera without the exchange of any specific configuration data between the cameras. Otherwise, the same effect can be achieved if camera and lens properties are communicated in as a part of the modulated signal of block 708. If the cameras have different camera and/or lens properties, and the cameras are unable to share configuration information with each other, then method 700 may be able to obtain orientation information, but not position information. Once the relative positions of the cameras are established in a 3D space, other physical sensors such as a gyroscope and accelerometer can be used to maintain positional lock relative to the other cameras.

Method 700 may then move to block 710 and construct a 3D digital image of the scene by combining images of a scene for a given image capture event. By doing so, method 700 may perform augmented reality applications where multiple users interact with each other. After an image capture event or a series of image capture events, cameras within the multi-camera system may share captured images and camera information by using a network multiple-access protocol, Wi-Fi®, and/or other form of network connection.

Figure 8:
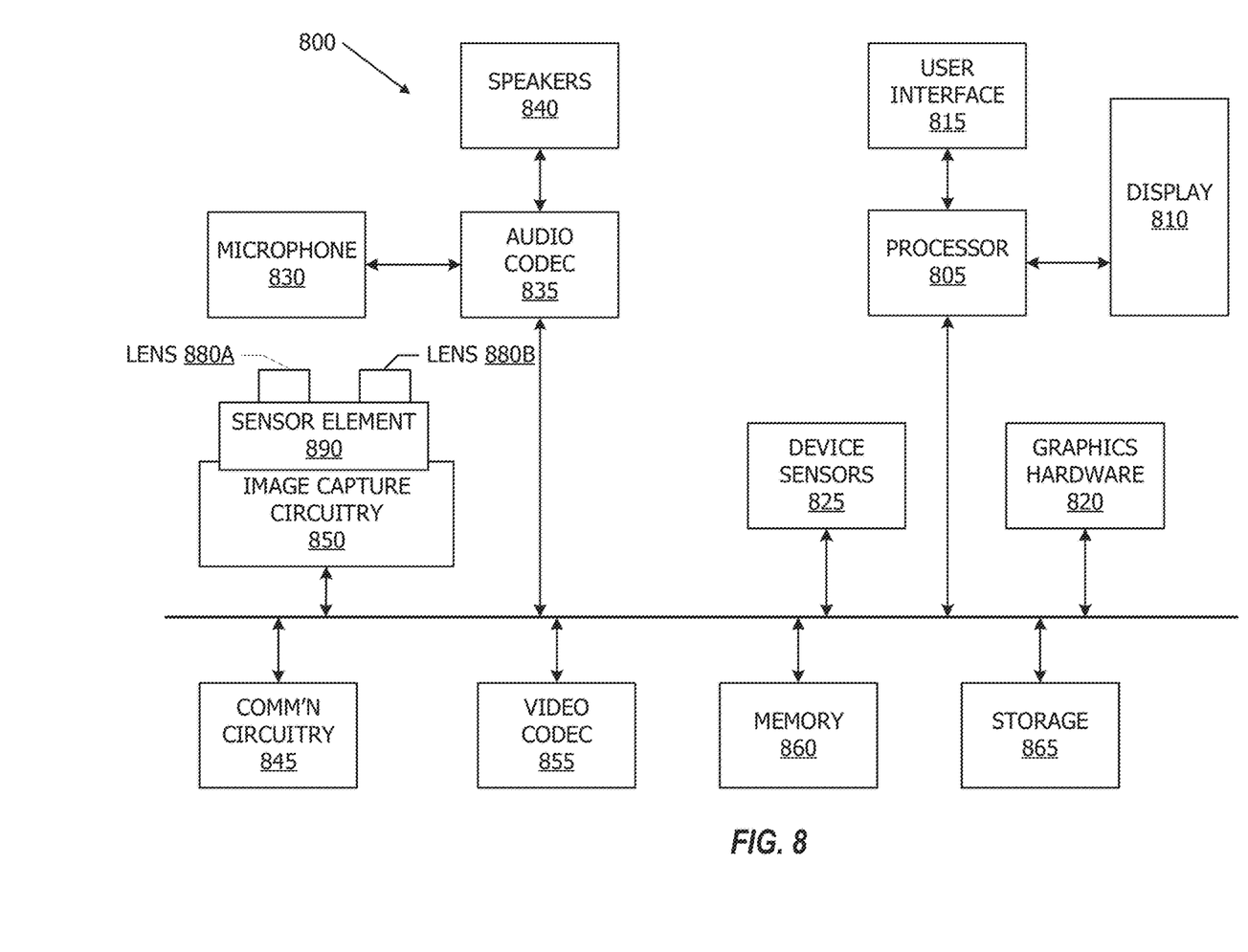
FIG. 8 shows, in block diagram form, a simplified multifunctional device according to one or more embodiments.

Referring now to FIG. 8, a simplified functional block diagram of illustrative multifunction device 800 is shown according to one embodiment. Multifunction electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture circuitry 850 (e.g., including camera system 100) video codec(s) 855 (e.g., in support of digital image capture unit 850), memory 860, storage device 865, and communications bus 870. Multifunction electronic device 800 may be, for example, a digital camera or a personal electronic device such as a personal digital assistant (PDA), personal music player, mobile telephone, or a tablet computer.

Processor 805 may execute instructions necessary to carry out or control the operation of many functions performed by device 800 (e.g., such as the generation and/or processing of images and single and multi-camera calibration as disclosed herein). Processor 805 may, for instance, drive display 810 and receive user input from user interface 815. User interface 815 may allow a user to interact with device 800. For example, user interface 815 can take a variety of forms, such as a button, keypad, dial, a click wheel, keyboard, display screen and/or a touch screen. Processor 805 may also, for example, be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable GPU.

Image capture circuitry 850 may include two (or more) lens assemblies 880A and 880B, where each lens assembly may have a separate focal length. For example, lens assembly 880A may have a short focal length relative to the focal length of lens assembly 880B. Each lens assembly may have a separate associated sensor element 890. Alternatively, two or more lens assemblies may share a common sensor element. Image capture circuitry 850 may capture still and/or video images. Output from image capture circuitry 850 may be processed, at least in part, by video codec(s) 865 and/or processor 805 and/or graphics hardware 820, and/or a dedicated image processing unit or pipeline incorporated within circuitry 865. Images so captured may be stored in memory 860 and/or storage 855.

Sensor and camera circuitry 850 may capture still and video images that may be processed in accordance with this disclosure, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805 such computer program code may implement one or more of the methods described herein.

It is to be understood that the above description is intended to be illustrative, and not restrictive. The material has been presented to enable any person skilled in the art to make and use the claimed subject matter as described herein, and is provided in the context of particular embodiments, variations of which will be readily apparent to those skilled in the art (e.g., some of the disclosed embodiments may be used in combination with each other). For example, while FIGS. 1-8 have been described in the context of processing raw or unprocessed images, this is not necessary. In addition, some of the described operations may have their individual steps performed in an order different from, or in conjunction with other steps, that presented herein. More generally, if there is hardware support some operations described in conjunction with FIGS. 1-6 may be performed in parallel.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause one or more programmable control devices to:

obtain, by a first image capturing system, communication synchronization with a second image capturing system;

generate, by the first image capturing system, a first flash pulse that projects a first light pattern into a scene at a first time, wherein the first flash pulse includes a modulated optical signal that encodes an image capturing system identifier of the first image capturing system;

capture, by the first image capturing system, a first image of the scene at the first time;

determine, by the first image capturing system, the second image capturing system will generate a second flash pulse at a second time based on the communication synchronization, wherein the second flash pulse projects a second light pattern into the scene;

capture, by the first image capturing system, a second image of the scene at the second time; and determine the orientation of the second image capturing system, relative to the first image capturing system, based on the first and the second image.

2. The non-transitory program storage device of claim 1, wherein the modulated optical signal includes a modulated amplitude of the first flash pulse to encode the image capturing system identifier of the first image capturing system.

3. The non-transitory program storage device of claim 1, wherein the instructions to cause the one or more programmable control devices to capture the second image of the scene at the second time comprise instructions to cause the one or more programmable control devices to decode a second optical signal emitted by the second image capturing system.

4. The non-transitory program storage device of claim 3, wherein the instructions to cause the one or more programmable control devices to decode the second optical signal comprise instructions to cause the one or more programmable control devices to decode the second optical signal to determine a focal length of the second image capturing system.

5. The non-transitory program storage device of claim 4, wherein the instructions further cause the one or more programmable control devices to determine, by the first image capture system, a location of the second image capture system in the scene based on the first image, the second image, and the focal length.

6. The non-transitory program storage device of claim 1, wherein the instructions further cause the one or more programmable control devices to determine a location of the at least one image capturing system in the scene based on the first and the second image and maintain position tracking relative to the at least one image capturing system using one or more motion sensors.

7. The non-transitory program storage device of claim 1, wherein the modulated optical signal modulates a time delay in reference to a timestamp for the optical signal to encode the image capturing system identifier of the first image capturing system.

8. The non-transitory program storage device of claim 1, wherein the instructions to cause the one or more programmable control devices to determine the relative orientation of the second image capturing system comprise instructions to cause the one or more programmable control devices to compare the differences between the first image and the second image based on a least error type algorithm.

9. The non-transitory program storage device of claim 1, wherein the instructions to cause the one or more programmable control devices to obtain communication synchronization with the second image capturing system comprise instructions to cause the one or more programmable control devices to generate a series of flash events to implement a network multiple-access protocol that obtains communication synchronization with the second image capturing system.

10. The non-transitory program storage device of claim 1, wherein the instructions to cause the one or more programmable control devices to capture the first image of the scene at the first time comprise instructions to cause the one or more programmable control devices to decode the modulated optical signal by decoupling a carrier pulse frequency information from the image capturing system identifier of the first image capturing system.

11. A method for coordinating devices in a structured light system, comprising:
obtaining, by a first image capture system, communication synchronization with a second image capture system;
generating, by the first image capture system, a first flash pulse that projects a light pattern into an environment at a first time, wherein the first flash pulse includes a modulated first flash pulse that encodes a system identifier of the first image capture system;
capturing, by the first image capture system, a first image of the environment at the first time;
determining, by the first image capture system, the second image capture system will flash at a second time based on the communication synchronization;
capturing, by the first image capture system, a second image of the environment at the second time; and
determining, by the first image capture system, an orientation of the second image capture system relative to the first image capture system based on the first and second images.

12. The method of claim 11, wherein the modulated first flash pulse includes a modulated amplitude of the first flash pulse to encode the system identifier of the first image capture system.

13. The method of claim 11, wherein capturing a second image of the environment at the second time further comprises decoding, by the first image capture system, a second flash pulse generated at the second time to identify the second image capture system and a focal length of the second image capture system.

14. The method of claim 13, wherein determining the orientation of the second image capture system further comprises determining, by the first image capture system, a location of the second image capture system in the environment based on the first image, the second image, and the focal length and maintaining position tracking relative to the second image capture system using one or more motion sensors.

15. The method of claim 11, wherein determining the orientation of the second image capture system further comprises comparing the differences between the first image and the second image using a least error type algorithm.

16. A system comprising:
a structured-light source;
an image capture device coupled to the structured-light source;
a memory; and
one or more programmable control devices operable to interact with the structured-light source, the image capture device, and the memory to perform operations comprising:
synchronizing, using the image capture device, with a second image capture device;
generating, using the image capture device, a first flash pulse from the structured-light source that projects a light pattern into a scene at a first image capture event, wherein the first flash pulse includes a modulated optical signal that encodes a device identifier of the image capture device;
capturing, by the image capture device, a first image of the scene at the first image capture event;
determining by the image capture device that the second image capture device will flash at a second image capture event based on the synchronization;
capturing, using the image capture device, a second image of the scene at the second capturing event, wherein the second image includes a second light pattern projected into the scene; and
determining a three-dimensional orientation of the second image device relative to the image capture device based on the first image and the second image.

17. The system of claim 16, wherein the modulated optical signal includes a modulated amplitude of the first flash pulse to encode the device identifier of the image capture device.

18. The system of claim 16, wherein the one or more programmable control devices further perform operations comprising determining a location of the second image capture device in the scene based on the first image and the second image and maintaining position tracking relative to the second image capture system using one or more motion sensors.

19. The system of claim 16, wherein determining a three-dimensional orientation of the second image capture device further comprises comparing the differences between the first image and the second image using a least error type algorithm.

20. The system of claim 16, wherein capturing the first image of the scene at the first image capture event comprises decoding the modulated optical signal by decoupling a carrier pulse frequency information from the device identifier.

* * * * *